(No Model.) 2 Sheets—Sheet 1.

E. CLIFF.
HOSE REEL.

No. 597,100. Patented Jan. 11, 1898.

WITNESSES:
Gustave Dieterich
John Kihlenbeck

INVENTOR
Edward Cliff
BY
Chas. C. Gill
ATTORNEY.

(No Model.) 2 Sheets—Sheet 2.

E. CLIFF.
HOSE REEL.

No. 597,100. Patented Jan. 11, 1898.

WITNESSES:
Gustave Dieterich
John Kehlenbeck

INVENTOR
Edward Cliff
BY
Chas. C. Gill
ATTORNEY.

THE NORRIS PETERS CO., PHOTO-LITHO., WASHINGTON, D. C.

UNITED STATES PATENT OFFICE.

EDWARD CLIFF, OF NEWARK, NEW JERSEY.

HOSE-REEL.

SPECIFICATION forming part of Letters Patent No. 597,100, dated January 11, 1898.

Application filed July 22, 1897. Serial No. 645,493. (No model.)

*To all whom it may concern:*

Be it known that I, EDWARD CLIFF, a citizen of the United States, and a resident of Newark, in the county of Essex and State of New Jersey, have invented certain new and useful Improvements in Hose-Reels, of which the following is a specification.

The invention relates to improvements in hose-reels, and particularly to improvements in hose-reels of the general character of reels described and claimed in Letters Patent of the United States No. 585,861, granted to me on July 6, 1897.

In accordance with the present invention the disks forming the opposite sides of the reel are secured to a hollow hub, around which the hose is wound and to which the nozzle of the hose is attached in order that it may receive the water through the hollow hub. Within the hollow hub, which is provided with a threaded bore, is an externally-threaded sleeve, which is connected with the usual water-supply apparatus and which coöperates with the hub in either sealing the water from the hose or permitting the flow of the water into the hose connected with the reel. The hose is wound upon the reel by revolving the latter upon the threaded sleeve above referred to and may be unwound from the reel by a reverse revolution of the reel upon said sleeve. The unwinding of the hose from the reel may be accomplished by taking hold of the discharge-nozzle of the hose and carrying it to the point at which it may be desired to put out a fire, and this operation of drawing on the hose will revolve the reel upon the aforesaid sleeve and move the said reel outward upon said sleeve sufficiently to permit the ready flow of the water from the usual water-supply apparatus to said reel. The reverse motion of the reel in winding up the hose will cause said reel to travel inward upon the said threaded sleeve and cut off the flow of water from the hose.

The invention will be fully understood from the detailed description hereinafter presented, reference being had to the accompanying drawings, in which—

Figure 1:
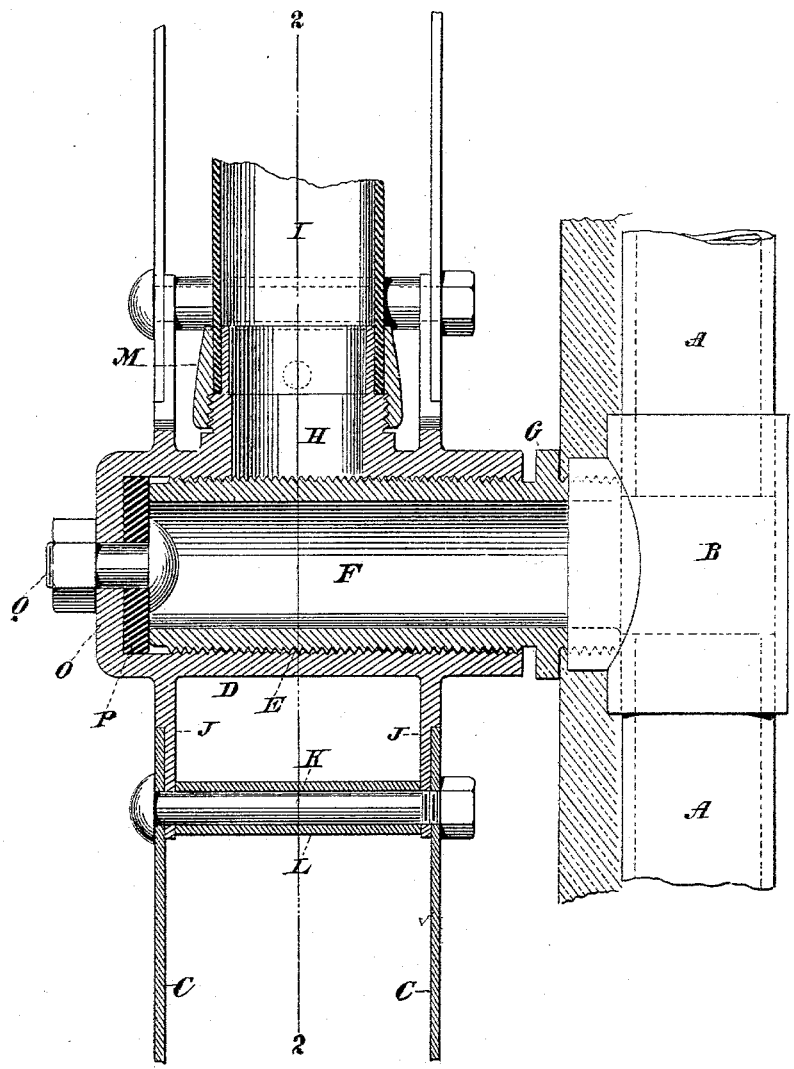
Figure 2:
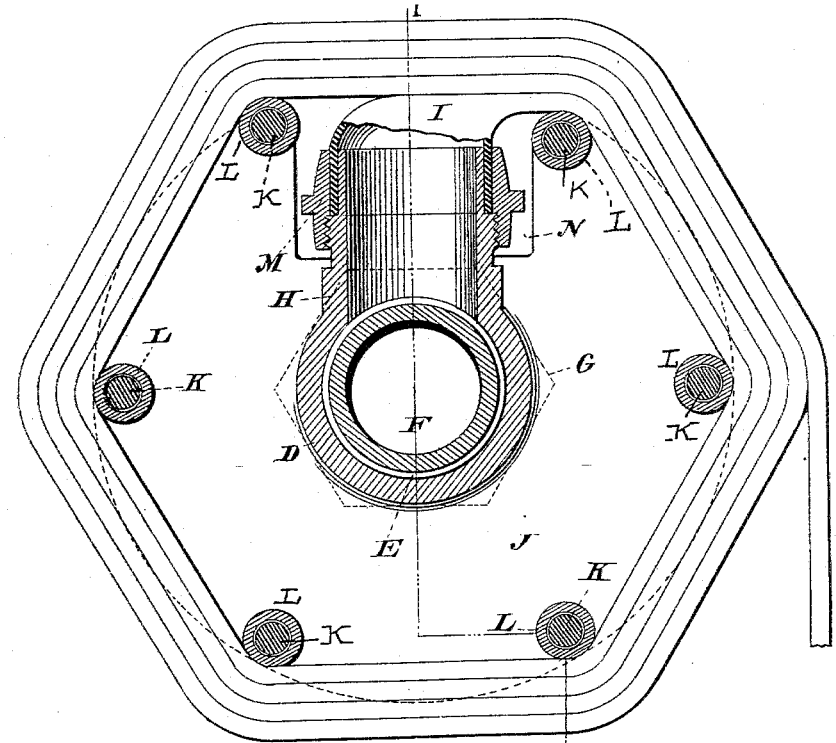
Figure 3:
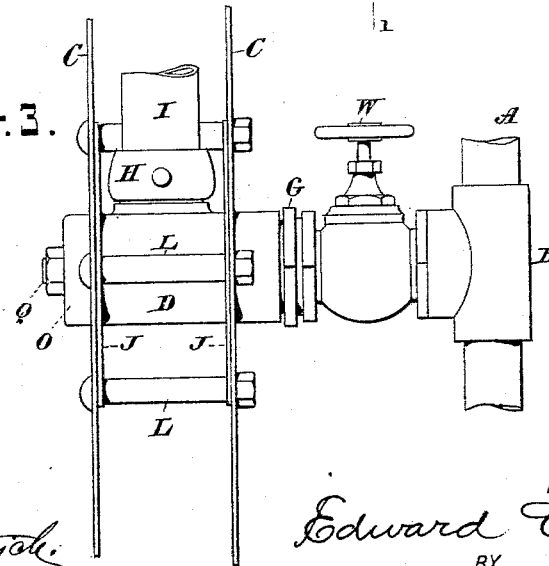

Figure 1 is a central vertical longitudinal section through a reel constructed in accordance with and embodying the invention, the section being on the dotted line 1 1 of Fig. 2. Fig. 2 is a central transverse section of same on the dotted line 2 2 of Fig. 1, and Fig. 3 is a side elevation of a detached portion of customary water-supply apparatus for buildings and to which the reel may be applied.

In the drawings, A designates the usual water-supply pipe found in tall buildings, and B the branch or coupling connected therewith and to which will be applied the reel made the subject of this application.

The reel comprises the disks C C and the hub D, the latter having an internally-threaded bore E and mounted upon the externally-threaded sleeve or pipe F, which is directly screwed to the branch or coupling B and serves as the medium through which the water from the pipe A flows into the bore E of the hub D and thence passes to the hose. The hub D is supported upon the threaded sleeve F and is adapted to travel outward and inward thereon in accordance with the direction of motion imparted to the reel. The sleeve or pipe F is stationary and is preferably provided with the polygonal head or shoulder G to facilitate its being firmly connected with the branch or coupling B.

The hub D is preferably cast integral with the threaded nozzle H to receive the hose I and also with the end flanges J J, to which the disks C C are secured by means of the series of bolts K, the latter having the thimbles or sleeves L, which extend between the flanges J J. The bolts K and sleeves L are distributed along the periphery of the flanges J J and become in effect a part of the hub of the reel, since upon said bolts and sleeves the reel I is wound, as illustrated. The hub of the reel is thus of hollow construction, and at one side of said hub and within the outline described by the bolts K is located the nozzle H, which communicates with the bore E of the hub and upon which, by means of the coupling M or other means, is secured the inner end of the hose I. Preferably the disks in line with the nozzle H and coupling M will be recessed, as at N, for convenience in applying the hose. By reason of the nozzle H being within the outline described by the bolts K the hose may be conveniently turned without undue creasing to pass over the bolts K.

The nozzle H is at about the center of the hub D, and preferably the distance between the disks C C will only be sufficient to freely receive the hose when the latter is wound in single layers one upon another.

The outer end of the sleeve or pipe F will be utilized to seal the water from the nozzle H, and hence within the cap O, formed at the outer end of the hub D, is provided the packing-disk P, which will preferably be held in place by the bolt Q, and which when the reel is screwed home upon the pipe or sleeve F will contact with the outer edges of said pipe or sleeve F, as illustrated in Fig. 1.

When the hose is wound upon the reel and the latter has been screwed home upon the externally-threaded pipe or sleeve F, the said reel will be in position and condition for immediate use. In case of a fire the discharge-nozzle of the hose will be taken hold of by the attendant and pulled toward the point at which the fire may be located, thus unwinding the hose from the reel and causing the latter to travel outward upon the threaded sleeve or pipe F until the nozzle H of the hub D has passed outward beyond the outer end of the said pipe or sleeve F, whereby a direct and full communication for the water is established between the pipe A and hose I. After the necessity for using the hose I has ceased to exist the reel will be reversed in its motion upon the branch pipe or sleeve F and the hose wound thereupon, during which operation the reel will travel inward upon the pipe or sleeve F, and the latter will close the nozzle G, and, finally, the end of said pipe or sleeve F will firmly contact with the packing-disk P and completely seal the water against entrance to the bore E or nozzle H.

The thimbles or sleeves L upon the bolts K serve to brace the flanges J J when the nuts are being firmly applied to said bolts for the purpose of securing the disks C C in position, and in addition the said thimbles or sleeves L form an increased surface over which the hose I may be wound.

The reel made the subject hereof is directly applied to the usual water-supply apparatus of a building, and said reel is of comparatively inexpensive construction and entirely convenient of use. The hub D will preferably be cast in one integral piece, and to the flanges of the hub will be applied the disks C C by means of the bolts K, the latter outlining the periphery of the hub portion of the reel and receiving upon them in regular uniform layers the hose I.

If desired, a valve W may be interposed between the sleeve F and pipe A for cutting off the water after the hose has been put into use.

What I claim as my invention, and desire to secure by Letters Patent, is—

1. In combination with the water-supply pipe, the externally-threaded sleeve F connected with said pipe, and the reel mounted upon and supported wholly from said sleeve adjacent to said supply-pipe and comprising the disks and the internally-threaded hub having the closed outer end and hose-nozzle, said sleeve extending substantially through the entire length of said hub toward said closed outer end when sealed; substantially as set forth.

2. In combination with the water-supply pipe, the externally-threaded sleeve F connected with said pipe, and the reel supported wholly from said sleeve adjacent to said pipe and comprising the disks, bolts and central internally-threaded hub, the latter being formed with the closed outer end, the hose-nozzle and the side flanges receiving said disks, said sleeve extending when sealed substantially through the entire length of said hub toward said closed outer end; substantially as set forth.

3. In combination with the water-supply pipe, the externally-threaded sleeve F connected with said pipe, the valve W intermediate said sleeve F and said supply-pipe, and the reel mounted upon and supported wholly from said sleeve adjacent to said supply-pipe and comprising the disks and internally-threaded hub having the closed outer end and hose-nozzle, said sleeve extending substantially through the entire length of said hub toward said closed outer end when sealed; substantially as set forth.

Signed at New York, in the county of New York and State of New York, this 20th day of July, A. D. 1897.

EDWARD CLIFF.

Witnesses:
 CHAS. C. GILL,
 E. JOS. BELKNAP.